United States Patent [19]

Shemanske et al.

[11] Patent Number: 4,622,506
[45] Date of Patent: Nov. 11, 1986

[54] LOAD AND SPEED SENSITIVE MOTOR STARTING CIRCUIT

[75] Inventors: Richard Shemanske, Brookfield; Young-Kee Min, Milwaukee, both of Wis.

[73] Assignee: PT Components, Milwaukee, Wis.

[21] Appl. No.: 680,489

[22] Filed: Dec. 11, 1984

[51] Int. Cl.⁴ .............................................. H02P 1/44
[52] U.S. Cl. .................................... 318/786; 318/785
[58] Field of Search .............. 318/785, 786, 778, 779, 318/817, 794; 361/33

[56] References Cited

U.S. PATENT DOCUMENTS

| | | |
|---|---|---|
| 1,974,989 | 2/1934 | Hamm . |
| 2,181,734 | 1/1939 | Mooney . |
| 2,576,084 | 12/1951 | Trevitt . |
| 2,774,021 | 5/1956 | Ehret . |
| 2,919,391 | 8/1959 | Charbonneaux . |
| 2,929,978 | 7/1960 | Petrocelli . |
| 2,991,402 | 2/1961 | Imada et al. . |
| 3,071,717 | 12/1963 | Gordon . |
| 3,071,718 | 4/1963 | Gordon . |
| 3,116,445 | 3/1963 | Wright . |
| 3,202,899 | 9/1965 | Gambill et al. . |
| 3,226,620 | 7/1965 | Elliott et al. . |
| 3,258,668 | 10/1966 | Milligan . |
| 3,307,093 | 4/1967 | Wright . |
| 3,349,307 | 2/1967 | Licata et al. . |
| 3,414,789 | 8/1968 | Prouty . |
| 3,421,064 | 1/1969 | Phillips ............................... 318/786 |
| 3,453,516 | 8/1969 | Conner . |
| 3,530,348 | 11/1970 | Conner . |
| 3,573,579 | 4/1971 | Lewus . |
| 3,667,017 | 2/1972 | Ramirez . |
| 3,671,830 | 6/1972 | Kruper ............................... 318/786 |
| 3,761,792 | 3/1973 | Witney et al. . |
| 3,766,457 | 3/1973 | Fink, Jr. et al. . |
| 3,777,232 | 3/1973 | Woods et al. . |
| 3,792,324 | 2/1974 | Suarez et al. ...................... 318/786 |
| 3,859,591 | 10/1975 | Saunders . |
| 3,882,364 | 12/1975 | Wright et al. . |
| 3,895,275 | 11/1975 | Rostad . |
| 3,950,657 | 4/1976 | Sheng et al. . |
| 3,970,908 | 7/1976 | Hansen et al. . |
| 4,065,804 | 6/1977 | Rostad . |
| 4,072,880 | 4/1978 | Oshima et al. . |

(List continued on next page.)

FOREIGN PATENT DOCUMENTS 0027524 4/1981 European Pat. Off.. .
1142248 3/1969 United Kingdom .

OTHER PUBLICATIONS

Excerpted from the article "What's New in Rotary Speed Switches", by Milton Leonard, Associate Editor, Machine Design; Jul. 27, 1972, copyright, 1972, by the Penton Publishing Co., Cleveland, Ohio.
SCR Manual, Fourth Edition, General Electric, 1967, pp. 222-223, General Electric Company, Dept. B. 3800 North Milwaukee Avenue, Chicago, Ill. 60641.
"Single-Phase Two-Valued Capacitor Motor Relay Section", D. L. Trower and C. Evert, AIEE Transactions, Feb. 1962, pp. 1141-1143.

*Primary Examiner*—David Smith, Jr.
*Attorney, Agent, or Firm*—Andrus, Sceales, Starke & Sawall

[57] ABSTRACT

A speed sensitive, load sensitive and AC line voltage fluctuation insensitive, motor starting system is provided for an AC motor having a main winding (1) and an auxiliary winding (2) both connectable across an AC power source (3). Relative magnitudes of main and auxiliary winding voltages are sensed and compared. The auxiliary winding is disconnected (5) from the AC source when the auxiliary winding voltage, including the components from the AC source and from rotationally induced voltage, rises above a predetermined value relative to the main winding voltage as a function of motor speed. After starting, when the motor is in a run mode and the auxiliary winding is disconnected from the AC source, only the rotationally induced auxiliary winding voltage is sensed. The auxiliary winding is reconnected to the AC source when the rotationally induced auxiliary winding voltage decreases below a given value relative to the main winding voltage corresponding to a given stall condition, to automatically restart the motor.

8 Claims, 5 Drawing Figures

U.S. PATENT DOCUMENTS

| | | | | | |
|---|---|---|---|---|---|
| 4,145,646 | 3/1979 | Werderitch . | 4,382,217 | 7/1983 | Horner et al. . |
| 4,152,758 | 7/1979 | Bailey et al. . | 4,395,671 | 8/1983 | Sandler et al. . |
| 4,292,555 | 4/1981 | Schaefer . | 4,399,394 | 10/1983 | Ballman . |
| 4,307,327 | 8/1981 | Streater et al. . | 4,401,933 | 6/1983 | Davy et al. . |
| 4,325,012 | 7/1982 | Schaefer . | 4,422,023 | 5/1983 | Iwasawa et al. . |
| 4,361,792 | 11/1982 | Davis, Jr. et al. . | 4,422,030 | 4/1983 | McAllise . |
| 4,366,426 | 2/1982 | Turlej . | 4,453,118 | 3/1984 | Phillips et al. . |
| 4,375,613 | 3/1983 | Fuller et al. ............ 318/786 | 4,496,895 | 4/1985 | Kawate et al. . |

LOAD AND SPEED SENSITIVE MOTOR STARTING CIRCUIT

BACKGROUND AND SUMMARY

The invention relates to disconnect switches for use with the start or auxiliary winding of an AC motor.

An AC motor has a main winding for running the motor, and a start or auxiliary winding for a capacitor run type motor and/or for starting the motor wherein the auxiliary winding is energized when starting the motor from rest and then disconnected at a given motor speed. The fields in the main and auxiliary windings are phase shifted, for example by capacitance, inductance, resistance or the like, to establish a rotating magnetic field for starting and/or running torque.

The present invention arose during development efforts attempting to replace the mechanical centrifugal disconnect switch for the auxiliary winding in a capacitor start type AC motor, though the invention is not limited thereto. In FIG. 1, main winding 1 and auxiliary winding 2 of an AC motor are connectable to an AC power source 3. Capacitor 4 provides the phase shift for starting torque. When the motor reaches a given threshold speed, switch 5 is opened to disconnect auxiliary winding 2 from power source 3.

Various types of switches 5, and controls therefor, are known. In one arrangement, a mechanical switch and centrifugal actuator are mounted on the motor shaft or rotor. At a given threshold speed, centrifugal weights are displaced radially outwardly to open the switch. While this type of actuation has proven useful for its intended purpose, it is nonetheless subject to the problems inherent in any mechanical type actuation system, including limited life, fatigue, friction, vibration, mounting position, contact wear, and so on. Also, the centrifugal switch has a radial extent and blocks axial air flow through the motor, which may impair cooling. Furthermore, the centrifugal switch has a given axial extent, thus requiring extra axial room in the motor, which may be objectionable in various applications.

In another known start winding disconnect system, Hall effect sensors or pick-up coils are used to detect RPM to actuate a disconnect switch. This approach may be objectionable because of the requirement of adding an extra element such as a magnet on the motor shaft, and the pick-up coil to sense speed. These extra parts and the assembly required may be cost objectionable.

In another known disconnect system, a timer is started at initial energization of the motor. When the timer times out, the disconnect switch is actuated to disconnect the auxiliary winding. This approach is not load or speed sensitive, but rather disconnects the auxiliary winding after a preselected time regardless of motor speed. This approach is limited to dedicated applications where the load on the motor is known beforehand, and the delay time set accordingly. If the load on the motor is increased, the motor speed will not be up to the desired threshold at the noted cut-out time. On the other hand, if the load on the motor is decreased, the motor will accelerate faster, and full voltage will be applied across the capacitor for a longer time than desired, which in turn may damage the motor and/or capacitor. Capacitor burn-out is a significant problem when reducing the loading of the motor in timed disconnect systems.

Another known approach is to sense current through the main winding and then actuate the disconnect switch at a designated condition. This requires a current sensor such as 6, FIG. 1, in series with the main winding and the start or auxiliary winding, which is objectionable to many manufacturers because of the cost of the extra components and the assembly cost of modifying the circuit and inserting such components in series in the circuit. This approach may also be objectionable due to the extra wattage and heat because current is still flowing through sensor 6 in the run mode after starting.

The present invention addresses and solves the above noted and other problems in a particularly simple and effective electronic control system for an auxiliary winding disconnect switch. The invention is load and speed sensitive, and is AC line voltage fluctuation insensitive. The invention eliminates the need for extra components on the motor shaft, around the shaft, or in series in the motor circuit. There is no physical modification of the motor components or the windings.

DETAILED DESCRIPTION

Figure 1:
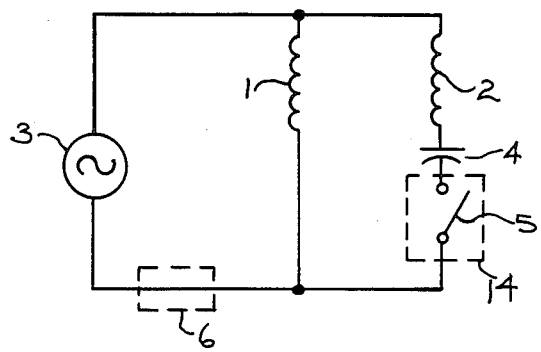
FIG. 1 schematically shows a typical environment in which the preferred embodiment of the invention is used.
Figure 2:
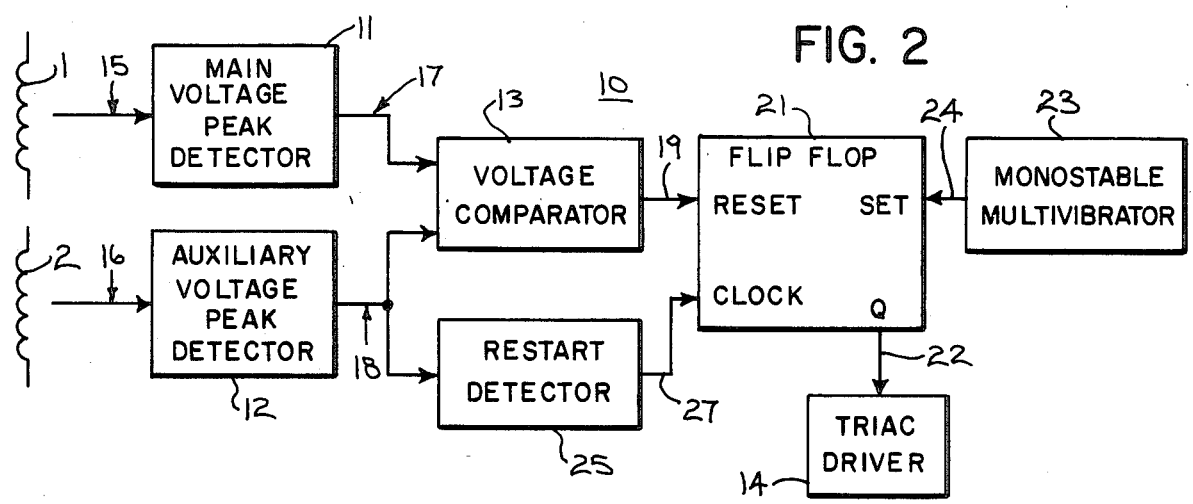
FIG. 2 is a schematic block circuit diagram illustrating a motor starting circuit in accordance with the invention.

FIG. 2 shows a control circuit 10 including main voltage detector means 11 for sensing the magnitude of main winding voltage, and auxiliary voltage detector means 12 for sensing the magnitude of auxiliary winding voltage. Voltage comparator means 13 is responsive to the main and auxiliary voltage detectors 11 and 12 and responds to a given relative relation between the magnitudes of the main and auxiliary winding voltages to turn off switch 5 of FIG. 1, for example via triac driver 14, to be described, to disconnect auxiliary winding 2 from AC source 3.

Figure 3:
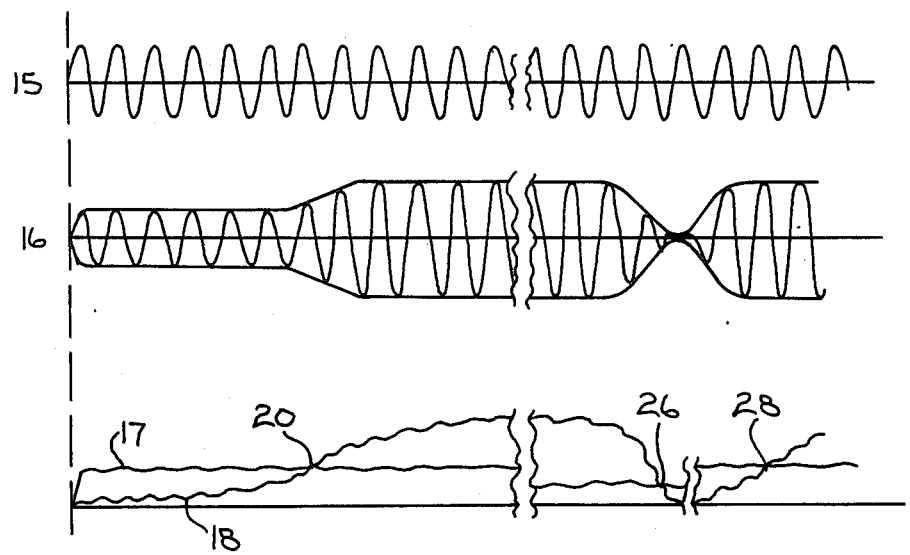
FIG. 3 is a timing diagram illustrating operation of the circuitry of FIG. 2.

Main voltage detector 11 senses the peaks of the AC main winding voltage 15, FIGS. 2 and 3. Auxiliary voltage detector 12 senses the peaks of the AC auxiliary winding voltage 16, the magnitude of which increases with increasing motor speed, as shown in FIG. 3. Voltage comparator 13 responds to the detected main and auxiliary voltage signals 17 and 18, respectively, and generates a turn-off signal on line 19 when the magnitude of the peaks of the AC auxiliary winding voltage 16, including components from AC source 3 and from rotationally induced voltage due to rotor rotation, increases above a predetermined value relative to the magnitude of the peaks of the AC main winding voltage 15, as a function of motor speed. For example, the waveforms at 17 and 18 represent the peaks of the respective main and auxiliary winding voltages 15 and 16, or reduced or divided values or fractions thereof. The magnitude of waveform 18 increases with increasing motor speed, and when it rises above the magnitude of waveform 17, as at crossover 20, or above a predetermined fraction thereof, voltage comparator 13 generates the noted turn-off signal. In the embodiment shown, the turn-off signal on line 19 resets flip flop 21 such that the latter's Q output goes low on line 22 to turn off triac driver 14 and disconnect auxiliary winding 2 from AC source 3.

Initial turn-on means 23 is responsive to initial energization of the motor to turn on switch 5 to connect auxiliary winding 2 to AC source 3 at initial start-up of the motor. One-shot monostable multivibrator 23 senses main winding voltage to generate a one-shot turn-on pulse on line 24 which sets flip flop 21 such that the latter's Q output goes high on line 22 to turn on triac driver 14 and thus close switch 5 and connect auxiliary winding 2 to AC source 3. The magnitudes of the main and auxiliary winding voltages are then compared, as above described, and auxiliary winding 2 is disconnected from the AC source when the auxiliary winding voltage 16, including the components from AC source 3 and from rotationally induced voltage due to rotation of the rotor, rises above a predetermined value such as 20 relative to the main winding voltage.

Restart detector means 25 senses rotationally induced voltage in the auxiliary winding during running of the motor after starting, i.e., after auxiliary winding 2 is disconnected from AC source 3. Restart detector 25 detects a given decrease in the induced auxiliary winding voltage as at 26, FIG. 3, corresponding to a stall condition of the motor, at which time restart detector 25 generates a turn-on signal on line 27 to turn on switch 5 and reconnect auxiliary winding 2 to AC source 3 to thus restart the motor from its stalled condition. The turn-on signal on line 27 clocks flip flop 21 such that the latter's Q output goes high on line 22 to turn on traic driver 14 and close switch 5. The motor is thus automatically restarted, without manual intervention. As the motor gains speed, the magnitude of waveform 18 again increases above the predetermined value as at 28, and flip flop 21 is again reset from line 19 to thus turn off traic driver 14 and switch 5, again disconnecting auxiliary winding 2 from AC source 3 after the automatic restart.

Figure 4:
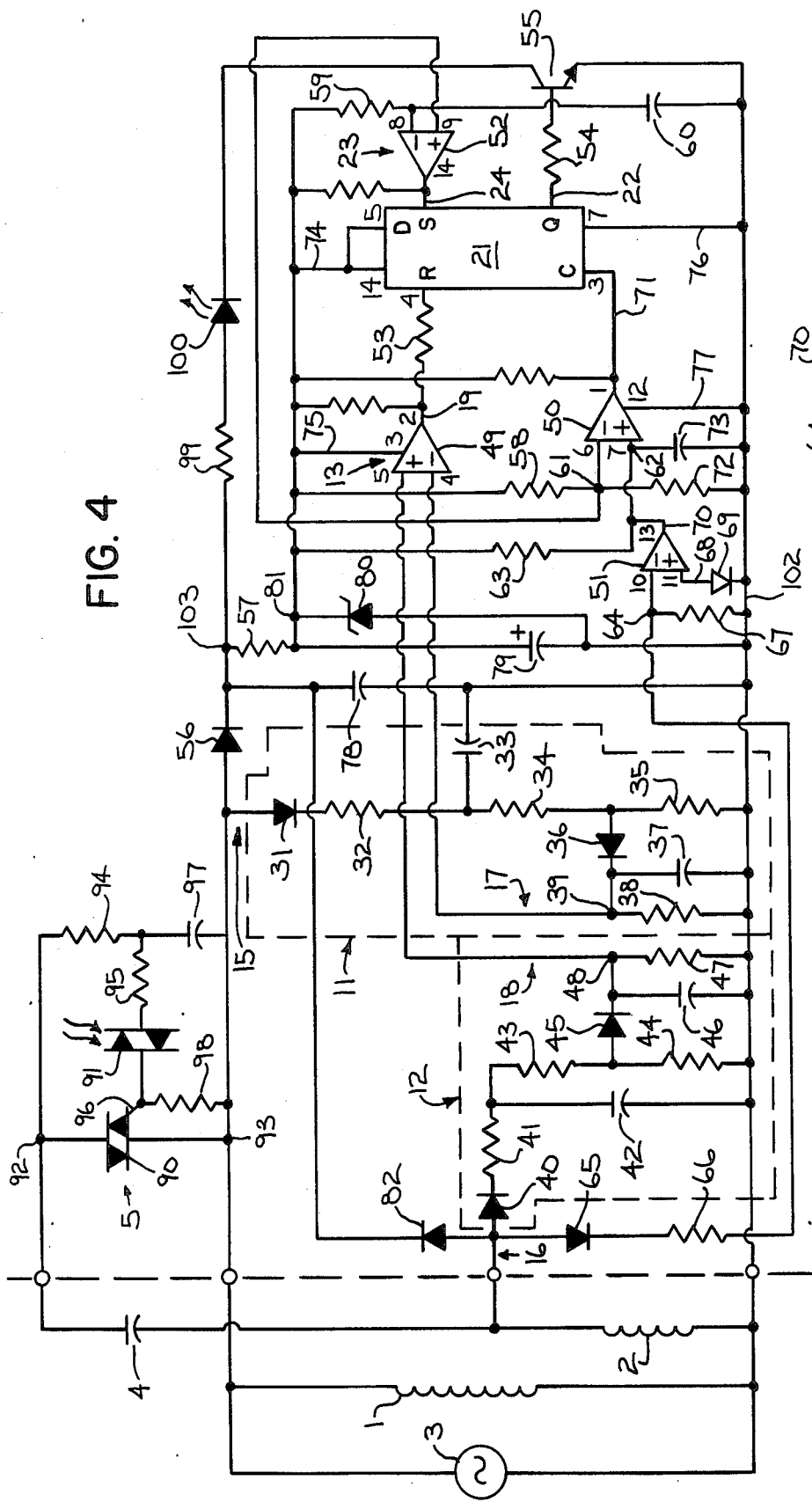
FIG. 4 is a detailed circuit diagram of the circuitry of FIG. 2.

FIG. 4 shows the detailed circuitry of FIG. 2 and like reference numerals are used to facilitate clarity. The main and auxiliary voltage peak detectors 11 and 12 in FIG. 2 are shown in the dashed line boxes 11 and 12 in FIG. 4. Main winding voltage is sensed through rectifying diode 31, resistor 32 and filtering capacitor 33, and then reduced through the voltage divider formed by resistors 34 and 35 and further sensed through diode 36, filtering capacitor 37 and resistor 38 to provide waveform 17 at node 39. Auxiliary winding voltage is sensed through rectifying diode 40, resistor 41 and filtering capacitor 42, and reduced by a voltage divider formed by resistors 43 and 44, and further sensed through diode 45, filtering capacitor 46 and resistor 47 to provide waveform 18 at node 48.

Nodes 48 and 39 are connected to the inputs of a comparator 49, which may be one-fourth of a quad comparator chip, such as an LM 339, wherein the other three comparators on the chip are shown at 50, 51 and 52, and wherein manufacturer designated pin number assignments are shown for clarity. Voltage comparator 13 of FIG. 2 is provided by comparator 49. The output of comparator 49 is connected through resistor 53 to the reset input of flip flop 21, such as an MC 14013B flip flop, where manufacturer designated pin number assignments are shown for clarity. When the voltage at input pin 5 of comparator 49 from node 48 increases above a predetermined value relative to the voltage on input pin 4 of comparator 49 from node 39, the output at pin 2 of comparator 49 goes high. In the embodiment shown, this transition occurs when the magnitude of waveform 18 representing the peaks of the auxiliary winding voltage 16 rises above, as at 20, FIG. 3, the magnitude of waveform 17 representing the peaks of the main winding voltage 15. The output of comparator 49 then transitions high which resets flip flop 21 such that the latter's Q output goes low on line 22 to provide a turn-off signal through resistor 54 to triac driver 14. When the signal on line 22 goes low, transistor 55 is no longer biased into conduction, which turns off switch 5, to be described more fully hereinafter.

Monostable multivibrator 23 is provided by comparator 52 comparing main winding voltage sensed through diode 56 and resistors 57, 58 and 72 against main winding voltage sensed through diode 56, resistors 57 and 59 and delayed by capacitor 60, to provide an output pulse on line 24 to the set input of flip flop 21 at initial energization of the motor such that the Q output of the flip flop on line 22 goes high to bias transistor 55 into conduction to turn on switch 5 and connect auxiliary winding 2 to AC source 3 at initial start up of the motor. The pulse on line 24 terminates when the delayed main winding voltage at input pin 8 of comparator 52 rises to the level of the main winding voltage at the other input pin 9 of comparator 52. This delay is determined by the charging time of capacitor 60. After termination of the pulse on line 24, the Q output of flip flop 21 stays high until the turn-off signal on line 19 resets flip flop 21 causing the Q output on line 22 to transition low, to turn off switch 5 and disconnect auxiliary winding 2 from AC source 3.

Comparator 50 compares a reference voltage from node 61 derived from AC source 3 through diode 56, resistor 57, and reduced by the voltage divider formed by resistors 58 and 72, against a stall condition voltage at node 62 derived from rotationally induced voltage in auxiliary winding 2 during running of the motor after starting and after auxiliary winding 2 has been disconnected from AC source 3. The voltage at node 62 is derived through diode 56, resistors 57 and 63, and from the output of comparator 51 on line 70, and by the change of capacitor 73. The negative input terminal of comparator 51 at node 64 senses auxiliary winding voltage through diode 65 and reduced by the voltage divider formed by resistors 66 and 67. The positive input of comparator 51 at line 68 is referenced to line 102 through diode 69. Primary comparator 51 thus has a pair of inputs 64 and 68 connected across auxiliary winding 2 and has a normally off output at line 70 which is low when rotationally induced voltage in the auxiliary winding is above a given value. When the rotationally induced voltage drops below a given value, the input at node 64 drops lower than that on line 68, and the output of comparator 51 changes state and transitions high on line 70, which in turn causes node 62 to go higher than node 61, i.e. capacitor 73 charges above the reference level of node 61, and hence secondary comparator 50 changes state such that its output on line 71 goes high, which clocks flip flop 21 such that the latter's Q output on line 22 goes high, thus issuing a turn-on signal to switch 5 to thus automatically restart the motor from the noted stall condition.

Figure 5:
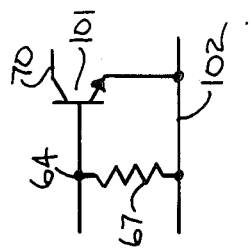
FIG. 5 is an isolated circuit diagram of a modification of a portion of FIG. 4.

In an alternate embodiment, FIG. 5, comparator 51 and diode 69 are replaced by bipolar transistor 101, where like connection line reference numerals from FIG. 4 are used for clarity. The emitter of transistor 101 is connected by line 70 to node 62 in FIG. 4. The base of transistor 101 is connected to node 64. The emitter of transistor 101 is connected to reference line 102. The base and emitter of transistor 101 are thus connected across auxiliary winding 2 and biased into conduction by the above noted rotationally induced voltage such that the voltage at the collector of transistor 101 is less than the reference voltage at node 61 in the normal run mode of the motor. In a stall condition, the rotationally induced voltage in auxiliary winding 2 drops below a given value, and the base drive for transistor 101 is reduced and the latter is rendered nonconductive such that the voltage at the collector of transistor 101 rises above the noted reference voltage at node 61 such that the output of comparator 50 on line 71 changes state and transitions high such that flip flop 21 is clocked and outputs a high turn-on signal on line 22 to turn on switch 5 and automatically restart the motor.

Main power supply means is connected to AC source 3 across main winding 1 and provides rectified voltage as the power source for flip flop 21 at line 74 and for quad comparator 49-52 at line 75, which components are referenced to line 102 respectively at lines 76 and 77. The main power supply is provided through diode 56 as filtered by capacitor 78 and through resistor 57 filtered by capacitor 79 and clamped by zener diode 80 to provide the main voltage power source at node 81, which in some embodiments may be in the form of rectified DC pulses. Auxiliary power supply means is provided and is phase displaced from the main power supply means and connected to AC source 3 across auxiliary winding 2, and providing rectified voltage at node 81 phase shifted from the main voltage and reducing ripple in the voltage supplied to flip flop 21 and quad comparator 49-52, to enhance voltage regulation. The auxiliary power supply is provided through diode 82 filtered by capacitor 78 and through resistor 57 filtered by capacitor 79 and clamped by zener diode 80. In the case of rectified DC pulses, the rectified DC pulses through diode 82 from auxiliary winding 2 are phase shifted from the rectified DC pulses through diode 56 from main winding 1.

Driver 14 and switch 5 comprise an optically isolated triac driver, as known in the art, for example an MC 3011, and will be only briefly described. Triac 90 is in series with capacitor 4 and auxiliary winding 2 across AC source 3, and has a gate circuit including a light responsive triac 91 for controlling conduction of triac 90. Triac terminal 92 is connected to one plate of capacitor 4 and triac terminal 93 is connected to AC source 3. When terminal 92 is positive with respect to terminal 93, and triac 91 is conductive, current flows from terminal 92 through limiting resistors 94 and 95 and through triac 91 to the gate 96 of the triac to bias the latter into conduction such that starting current may flow through triac 90 between terminals 92 and 93. Capacitor 97 and resistor 94 provide a snubber network for optotriac driver 91. Resistor 98 provides gate stability.

The turn-off signal on line 22 is delivered through resistor 54 to the base of bipolar transistor 55 to bias the latter into conduction which in turn completes a circuit through resistor 99 and light emitting diode 100. LED 100 is optically coupled to light responsive triac 91 to activate the latter and initiate conduction of triac 90.

The above noted main and auxiliary power supply means provided through respective diodes 56 and 82 supply a first high voltage at node 103 to switch driver components 100 and 55. The main and auxiliary power supply means include secondary power supply means at node 81 through resistor 57 supplying a second lower voltage at node 81 to flip flop 21 and quad comparator 49-52. Both of the noted high and lower voltages at nodes 103 and 81 are DC and have reduced ripple. Node 81 is a common node connected to both of said main and auxiliary windings through respective diodes 56 and 82 and providing a combined power supply.

The invention provides a speed sensitive, load sensitive, and AC line voltage fluctuation insensitive, motor starting method comprising sensing and comparing relative voltage magnitudes of main and auxiliary winding voltages, and disconnecting the auxiliary winding from the AC source when the auxiliary winding voltage, including the components from the AC source and from rotationally induced voltage, rises above a predetermined value, as at 20, FIG. 3, relative to the main winding voltage. Since relative magnitudes of the voltages are being compared, the system is insensitive to AC line voltage fluctuation. The system is load and speed sensitive because the auxiliary winding voltage magnitude increases with increasing motor speed. The main winding voltage is sensed at initial energization of the motor and the auxiliary winding is initially connected to the AC power source. After starting, when the motor is in a run mode and the auxiliary winding is disconnected from the AC source, only rotationally induced auxiliary winding voltage is sensed. The auxiliary winding is reconnected to the AC source when the rotationally induced auxiliary winding voltage decreases below a given value relative to the main winding voltage, as at 26, FIG. 3, corresponding to a given stall condition, to automatically restart the motor without interruption of power from the AC source.

It is recognized that various modifications and alternatives are possible within the scope of the appended claims.

We claim:

1. In an AC motor having a main winding and an auxiliary winding both connectable to an AC power source, and having a switch for disconnecting said auxiliary winding from said AC source, an improved control circuit for said switch comprising:

main voltage detector means for sensing the magnitude of the AC main winding voltage;

auxiliary voltage detector means for sensing the magnitude of the AC auxiliary winding voltage;

initialization means sensing main winding voltage at initial energization of said motor;

flip flop means responsive to said initialization means to output a turn-on signal to said switch to connect said auxiliary winding to said AC source;

voltage comparator means responsive to said main and auxiliary detector means and comparing the magnitude of the auxiliary winding voltage against the magnitude of the main winding voltage;

said flip flop means also being responsive to said voltage comparator means to output a turn-off signal to said switch to disconnect said auxiliary winding from said AC source when the magnitude of the auxiliary winding voltage increases above a predetermined value relative to the magnitude of the main winding voltage as a function of motor speed.

2. The invention according to claim 1 comprising:
main power supply means connected to said AC source across said main winding and providing rectified voltage as the power source for said flip flop means; and
auxiliary power supply means phase displaced from said main power supply means and connected to said AC source across said auxiliary winding and providing rectified voltage phase shifted from said main voltage and reducing ripple in the voltage supplied to said flip flop means, to enhance voltage regulation.

3. The invention according to claim 2 comprising a switch driver connected between said flip flop means and said switch,
and wherein said main and auxiliary power supply means supply a first high voltage to said switch driver, and including secondary power supply means supplying a second lower voltage from said main and auxiliary power supply means to said flip flop means, both of said high and lower voltages being DC and having said reduced ripple.

4. The invention according to claim 1 comprising:
second voltage comparator means comparing a reference voltage derived from said AC source against a stall condition voltage derived from rotationally induced voltage in said auxiliary winding during running of said motor after starting and after said auxiliary winding is disconnected from said AC source;
said flip flop means also being responsive to said second voltage comparator means to output a turn-on signal to said switch to reconnect said auxiliary winding to said AC source in response to a given decrease in said last mentioned voltage.

5. The invention according to claim 4 wherein said second voltage comparator means comprises a pair of voltage comparators comprising:
a primary comparator having a pair of inputs connected across said auxiliary winding and having a normally off output when said rotationally induced voltage is above said given value; and
a secondary comparator comparing said output of said primary comparator against said reference voltage,
such that when said rotationally induced voltage drops below said given value, said output of said primary comparator changes state, which in turn causes said secondary comparator to change state, and said flip flop means responds to said changed state output of said secondary comparator by outputting said turn-on signal to said switch.

6. The invention according to claim 4 wherein said second voltage comparator means includes transistor means having its base and one of its emitter and collector connected across said auxiliary winding and biased into conduction by said rotationally induced voltage such that the voltage at the other of its emitter and collector is less than said reference voltage, and such that when said rotationally induced voltage drops below a given value, the base drive for said transistor means is reduced and the latter is rendered nonconductive such that the voltage at said other of its emitter and collector rises above said reference voltage such that the output of said second voltage comparator means changes state and said flip flop means responds by outputting said turn-on signal to said switch.

7. The invention according to claim 4 wherein said initialization means comprises third voltage comparator means comparing main winding voltage against main winding voltage delayed by capacitor means, to provide an output pulse to said flip flop means at initial energization of said motor, said pulse terminating when said delayed main winding voltage at one input of said third voltage comparator means rises to the level of said main winding voltage at the other input of said third voltage comparator means.

8. The invention according to claim 7 comprising a common node connected to both of said main and auxiliary windings and providing a combined power supply powering said flip flop means and each of said first, second and third voltage comparator means and comprising:
main power supply means connected to said AC source across said main winding and providing rectified voltage as the power supply for said flip flop means and each of said first, second and third voltage comparator means; and
auxiliary power supply means phase displaced from said main power supply means and connected to said AC source across said auxiliary winding and providing rectified voltage phase shifted from said main voltage and reducing ripple in the voltage supplied to said flip flop means and each of said first, second and third voltage comparator means.

* * * * *